United States Patent
Kobayashi et al.

(10) Patent No.: US 12,391,206 B2
(45) Date of Patent: Aug. 19, 2025

(54) SIDE AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(*) Notice: Subject to any disclaimer, the term of this patent is extended or adjusted under 35 U.S.C. 154(b) by 0 days.

(21) Appl. No.: 18/721,365

(22) PCT Filed: Nov. 9, 2022

(86) PCT No.: PCT/JP2022/041643
§ 371 (c)(1),
(2) Date: Dec. 26, 2024

(87) PCT Pub. No.: WO2023/119919
PCT Pub. Date: Jun. 29, 2023

(65) Prior Publication Data
US 2025/0115208 A1    Apr. 10, 2025

(30) Foreign Application Priority Data
Dec. 23, 2021 (JP) ................................ 2021-208976

(51) Int. Cl.
*B60R 21/207* (2006.01)
*B60R 21/231* (2011.01)
*B60R 21/237* (2006.01)

(52) U.S. Cl.
CPC ...... *B60R 21/207* (2013.01); *B60R 21/23138* (2013.01); *B60R 21/237* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | | |
|---|---|---|---|---|
| 8,282,126 | B2 * | 10/2012 | Wiik | B60R 21/233 280/730.2 |
| 9,004,526 | B2 * | 4/2015 | Fukawatase | B60R 21/214 280/729 |
| 9,016,718 | B2 * | 4/2015 | Fukawatase | B60R 21/233 280/730.2 |
| 11,407,376 | B2 * | 8/2022 | Moon | B60R 21/23138 |
| 11,440,499 | B2 * | 9/2022 | Shibahara | B60R 21/20 |
| 11,491,946 | B2 * | 11/2022 | Azuma | B60R 21/23138 |
| 11,912,225 | B2 * | 2/2024 | Azuma | B60R 21/23138 |
| 12,134,363 | B2 * | 11/2024 | Ueda | B60R 21/207 |
| 2021/0101552 | A1 | 4/2021 | Kim | |
| 2024/0140348 | A1 * | 5/2024 | Jang | B60R 21/231 |

FOREIGN PATENT DOCUMENTS

| | | | |
|---|---|---|---|
| CN | 216546081 U | * | 5/2022 |
| JP | 2021-175623 A | | 11/2021 |
| WO | 2020/002287 A1 | | 1/2020 |

* cited by examiner

Primary Examiner — Faye M Fleming

(57) ABSTRACT

A side airbag device has an airbag cushion with a deployment profile that may readily be controlled and may reliably receive and protect an occupant. The side airbag device has a bag-shaped airbag cushion that utilizes gas supplied from an inflator to expand and deploy to a side of a vehicle seat, an interior base material panel of the airbag cushion lower end vicinity is folded back to an opposite side (far side) of an occupant of the vehicle seat and makes friction contact with an upper surface of a console box arranged between the vehicle seat and an adjacent seat.

9 Claims, 3 Drawing Sheets

SIDE AIRBAG DEVICE

TECHNICAL FIELD

The present invention is related to a side airbag device provided with a bag-shaped airbag cushion that expands and deploys to a side of the occupant in a vehicle seat in the event of a vehicle side impact or the like.

BACKGROUND ART

Airbag devices have generally become standard equipment in vehicles in recent years. An airbag device is a safety device that is operated in the event of an emergency such as a vehicle collision to receive and protect an occupant by inflating and deploying an airbag cushion with gas pressure. As an example, a side airbag device is provided with a bag-shaped airbag cushion that expands and deploys to a side of the occupant in a vehicle seat in the event of a vehicle side impact or the like.

Normally, when a vehicle receives an impact in a lateral direction, the occupant moves in a vehicle width direction. For example, in the event of a side impact in which an object such as another vehicle, a utility pole, or the like (impact object) impacts a front passenger seat side door, there are two main types of side airbags that protect an occupant. The first is a so-called near-side airbag, which expands and deploys between a front passenger seat and a side door, preventing an occupant in the front passenger seat from being impacted by the side door on an impact object contact side (near side for the occupant). The second is a so-called far-side airbag, which expands and deploys between the driver's seat and the front passenger seat and protects an occupant in the driver's seat from being moved to the impact object contact (far side for the occupant), in other words, the center of the vehicle, by the impact from the lateral direction.

Patent Document 1 discloses an occupant restraint system provided with an airbag bag body. The airbag bag body is a far side airbag that utilizes gas supplied from an inflator to expand and deploy between a console box of the vehicle and the seat system (vehicle seat). A bottom part of the airbag bag body deploys at a position below an upper surface of the console box. In addition, an upper part of the airbag bag body deploys at a position above the upper surface of the console box.

In Patent Document 1, when the occupant applies a load to the airbag bag body, a part of the airbag bag body makes contact with the console box and receives support in the lateral direction, countering a force from the occupant applied to the airbag bag body. Furthermore, an aspect of this support in the lateral direction is to hinder movement of the airbag bag body in the lateral direction enabling further restraint of the occupant.

RELATED ART DOCUMENTS

Patent Documents

Patent Document 1: Japanese Unexamined Patent Application Publication 2012-81958

SUMMARY OF THE INVENTION

Problem to be Solved by the Invention

In the occupant restraint system of Patent Document 1, the bottom part of the airbag bag body deploys at a position lower than the upper surface of the console box and is interposed in a narrow gap between the vehicle seat and the console box. Therefore, in Patent Document 1, the deployment behavior of the far-side airbag was difficult to control during expansion and deployment, and thus there is room for improvement with regard to sufficiently restraining and protecting an occupant.

In light of the foregoing, an object of the present invention is to provide a side airbag device for which the deployment behavior of an airbag cushion during expansion and deployment can readily be controlled and that can reliably receive and protect an occupant.

Means for Solving the Problem

In order to resolve the problem described above, a typical configuration of a side airbag device according to the present invention is a side airbag device having a bag-shaped airbag cushion that utilizes gas supplied from an inflator to expand and deploy to a side of a vehicle seat, wherein:

the airbag cushion includes an interior base material panel provided on an occupant side and an exterior base material panel provided on a side opposite the occupant, a surface of a lower end vicinity of the airbag cushion opposite the occupant is folded back in an upward direction and the interior base material panel of the lower end vicinity is stowed in the vehicle seat so as to be positioned on the side opposite the occupant, and the interior base material panel of the lower end vicinity makes friction contact with an upper surface of a console box arranged between the vehicle seat and an adjacent seat during expansion and deployment of the airbag cushion.

In the configuration described above, the lower end vicinity of the airbag cushion is folded back to the side opposite the occupant. Here, the lower end vicinity of the airbag cushion is a portion of the airbag cushion positioned below the upper surface of the console box during expansion and deployment when the side airbag device is assembled to the vehicle seat by itself and the console box is not present. In the configuration describe above, the interior base material panel of the airbag cushion lower end vicinity makes friction contact with the upper surface of the console box during expansion and deployment. Therefore, movement of the airbag cushion in the vehicle width direction on the upper surface of the console box is suppressed making sliding difficult.

Therefore, the lower end vicinity of the airbag receives sufficient reaction force from the upper surface of the console box during expansion and deployment and so becomes a back shield for the airbag cushion and can provide overall support to the airbag cushion in restraining the occupant. As a result, even in the case, for example, the occupant falls toward the center of the vehicle, support of the airbag cushion provided by the lower end vicinity enables reliable receiving and protecting of the occupant during expansion and deployment.

In this manner, the lower end vicinity of the airbag cushion is folded back to the side opposite the occupant and makes friction contact with the upper surface of the console box during expansion and deployment. Therefore, the lower end vicinity of the airbag cushion less readily enters into the gap between the vehicle seat and the console box, simplifying control of deployment behavior.

When the lower end vicinity of the airbag cushion makes friction contact with the upper surface of the console box, the airbag cushion bends in a convex arch toward the vehicle seat. In addition, the airbag device described above is preferably provided at the center of the vehicle where the console box is provided, in other words on the far side (side of seat at center of vehicle).

Here, in a state where the console box is not present, the airbag cushion essentially expands and deploys in approximately a straight line in the vertical direction of the vehicle. On the other hand, with the configuration described above, the lower end vicinity of the airbag cushion makes friction contact with the upper surface of the console box and receives a reaction force, causing the airbag cushion to bend overall in an arch. This causes a force on the airbag cushion attempting to return to a natural shape of approximately a straight line in the vertical direction of the vehicle during expansion and deployment. Thereby, even in a case where the occupant falls towards the center of the vehicle, the airbag cushion can support the occupant by means of the force of attempting to return to normal shape.

Note that larger contact surface area of the lower end vicinity of the airbag cushion in friction contact with the upper surface of the console box increases the reaction force from the upper surface of the console box. Therefore, if the airbag cushion is folded and bent in an L shape causing the entire lower end vicinity to make friction contact with the upper surface of the console box, a large reaction force can be received from the upper surface of the console box. However, if the airbag cushion is bent into an L shape, a force causing returning to the original shape is difficult to generate. Therefore, the shape of the airbag cushion is preferably a shape of being bent in a convex arch toward the vehicle seat when the lower end vicinity makes friction contact with the upper surface of the console box.

The lower end vicinity of the airbag cushion described above is preferably provided at a position higher than the upper surface of the console box when stowed in the vehicle seat.

Thereby, the lower end vicinity of the airbag cushion will not enter into the gap of the vehicle seat and the console box during expansion and deployment, simplifying deployment behavior control and further enabling reliable friction contact of the lower end vicinity with the upper surface of the console box.

The folded back position where the lower end vicinity of the airbag cushion is folded back when the airbag cushion is stowed in the vehicle seat is preferably at a position higher than the upper surface of the console box.

With this configuration, the lower end vicinity of the airbag cushion will not enter into the gap of the vehicle seat and the console box during expansion and deployment, simplifying deployment behavior control and further enabling reliable friction contact of the lower end vicinity with the upper surface of the console box.

The lower end vicinity of the airbag cushion interior base material panel is preferably provided with a high friction surface having a higher friction coefficient than another surface of the airbag cushion on the contact surface that makes friction contact with the upper surface of the console box.

Thus, the contact surface with high friction coefficient of the lower end vicinity of the airbag cushion makes friction contact with the upper surface of the console box making sliding on the upper surface of the console box more difficult during expansion and deployment.

Effect of the Invention

The present invention can provide a side airbag device for which controlling the deployment behavior of an airbag cushion during expansion and deployment can be readily achieved and that can reliably receive and protect an occupant.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Note that regarding this Embodiment, when an occupant is seated in a seat in a regular posture, the direction the occupant faces is referred to as front, and the opposite direction is referred to as rear. Furthermore, when the occupant is seated in the seat in a regular posture, the right of the occupant is referred to as the right direction, and the left of the occupant is referred to as the left direction. Furthermore, when the occupant is seated in a regular posture, the direction towards the head of the occupant is referred to as up, and the direction towards the legs of the occupant is referred to as down. Furthermore, as needed, any diagrams used in descriptions below will indicate the front, rear, left, right, up, and down directions based on the occupant as described above as Front, Rear, Left, Right, Up, and Down.

Figure 1:
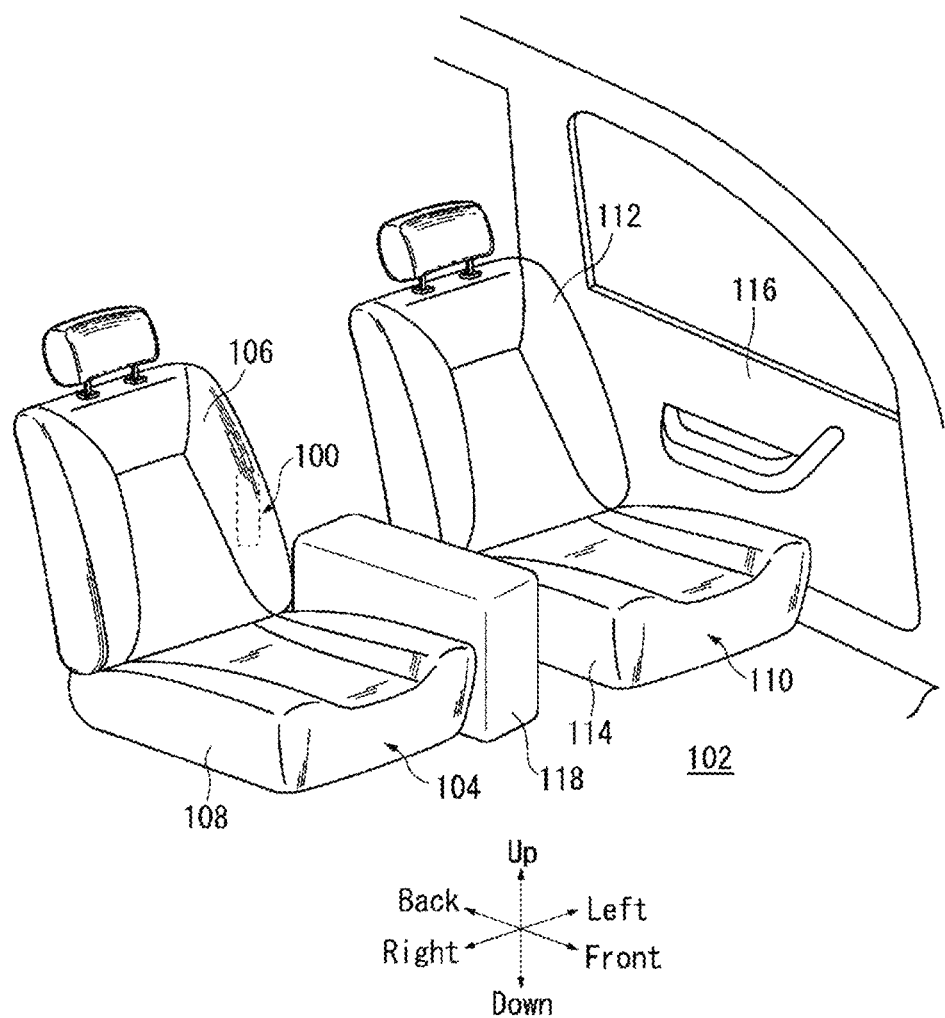
FIG. 1 is a diagram illustrating a part of a vehicle to which a side airbag device of an embodiment of the present invention is applied.

FIG. 1 is a diagram depicting a part of a vehicle 102 to which a side airbag device 100 of an embodiment of the present invention is applied. As indicated by the dotted lines in the drawing, the side airbag device 100 is embedded in a side portion on a center side of the vehicle of a seat back 106 of the vehicle seat 104. The vehicle seat 104 is a right-side front seat (in other words, a driver's seat) in the vehicle 102 and has the seat back 106 as well as a seat cushion 108 on which an occupant is seated.

An adjacent seat (vehicle seat 110) adjacent to the vehicle seat 104 is arranged in the vehicle 102. The vehicle seat 110 is a left-side front seat (in other words, a front occupant seat) and has a seatback 112 and a seat cushion 114. Furthermore, a side door 116 is positioned on an outer side of the vehicle of the vehicle seat 110. Furthermore, a console box 118 is disposed in the vehicle 102.

The console box 118 is positioned between the vehicle seats 104, 110 and is therefore positioned on an opposite side of the vehicle from an occupant side of the vehicle seat 104, in other words, on the center side of the vehicle, which is a far side as viewed from the occupant. In addition, the side airbag device 100 is provided with a bag-shaped airbag cushion 120 (see FIG. 2) that expands and deploys to the far side of the vehicle seat 104 in the event of a vehicle side impact or the like. Note that the side airbag device 100 may be embedded in a side surface on the center side of the vehicle of a seatback 112 of the vehicle seat 110.

Figure 2A:
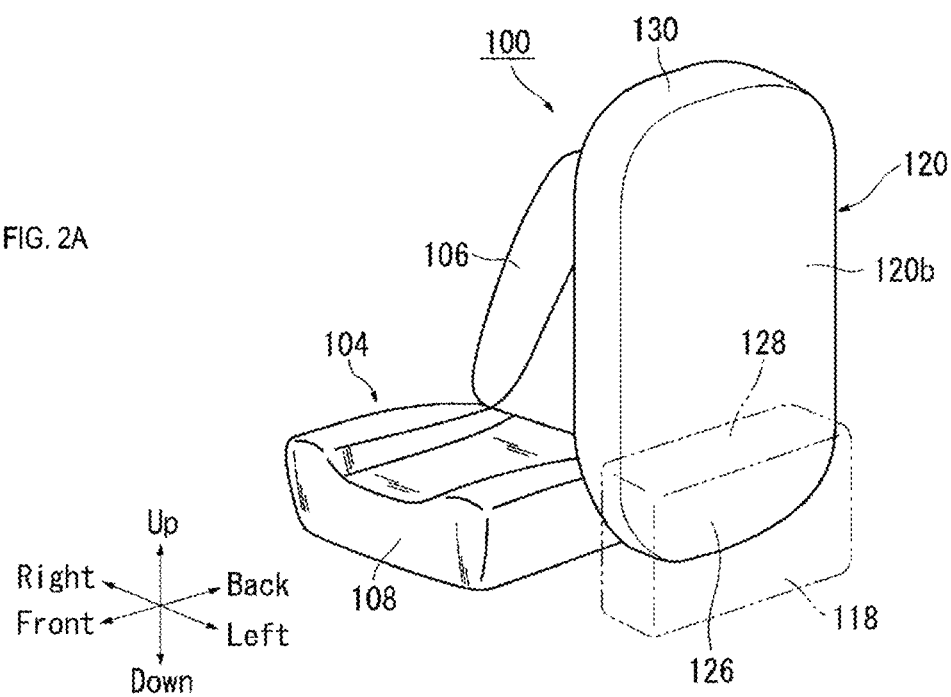
FIGS. 2(a) and 2(b) are diagrams illustrating the side airbag device in FIG. 1.
Figure 2B:
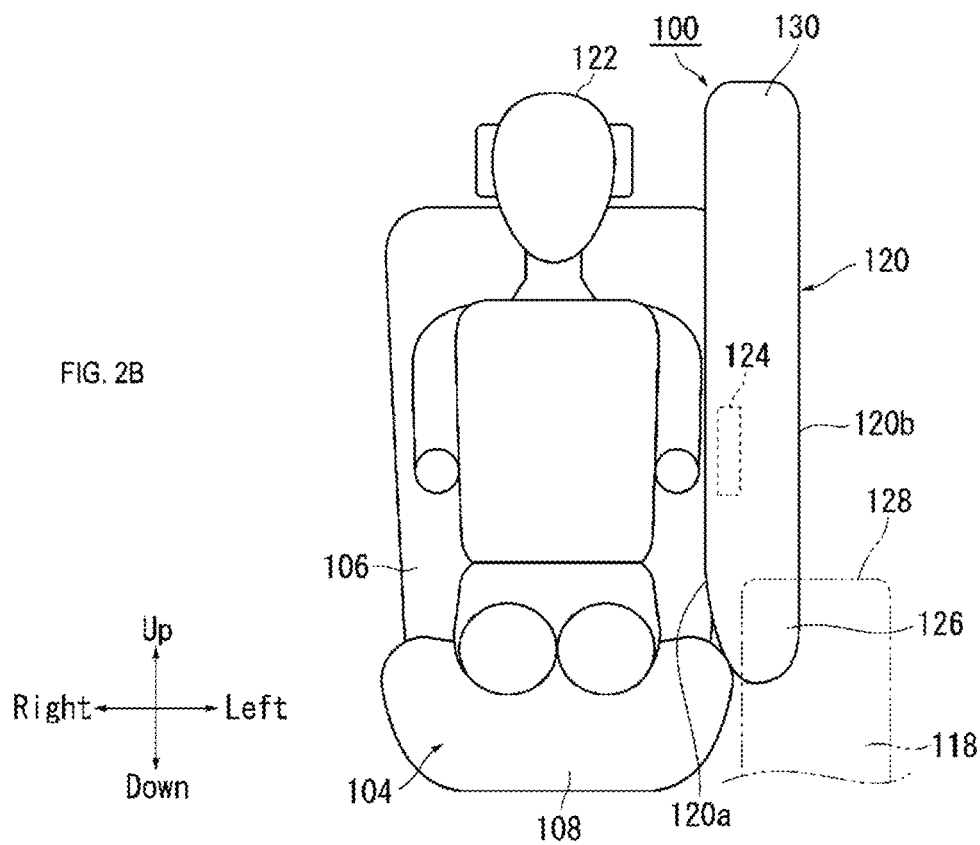

FIGS. 2(a) and 2(b) are diagrams illustrating the side airbag device 100 in FIG. 1. FIG. 2(a) illustrates a state of the side airbag device 100 assembled to a vehicle seat 104 and the airbag cushion 120 expanded and deployed with a console box 118 absent, as indicated by the dot-chain line in the diagram. FIG. 2(b) illustrates a state of the side airbag device 100 of FIG. 2(a) as viewed from the front of the vehicle together with an occupant 122 seated in the vehicle seat 104.

The side airbag device 100 is provided with an inflator 124 indicated by the dotted lines in FIG. 2(b) in addition to the airbag cushion 120. The airbag cushion 120 is formed into a bag shape by spinning and weaving, for example, using OPW (One-Piece Woven). The inflator 124 is a gas generating device. The airbag cushion 120 is expanded and deployed using gas supplied from the inflator 124 in the event of an emergency, such as when the vehicle 102 is impacted, or the like. The airbag cushion 120 expands and deploys between the vehicle seat 104 and vehicle seat 110 as illustrated in FIG. 1 and functions as a so-called far-side airbag.

As indicated in FIG. 2(a) and FIG. 2(b), the airbag cushion 120 includes an interior base material panel 120a provided on the side of the occupant 122 and an exterior base material panel 120b provided on the side opposite the occupant 122. In a state with the console box 118 not present, the airbag cushion 120 expands and deploys in nearly a straight vertical line and a lower end vicinity 126 thereof is positioned lower than an upper surface 128 of the console box 118. Here, an upper end part 130 of the airbag cushion 120 is positioned above the seat back 106 of the vehicle seat 104.

Figure 3A:
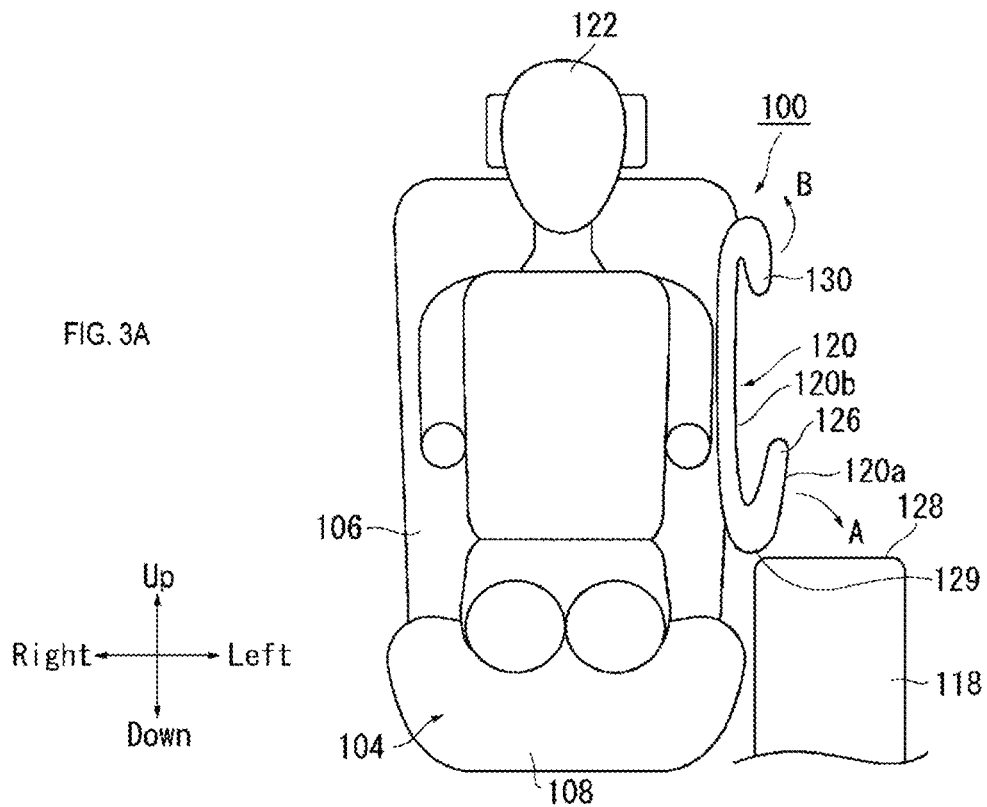
FIGS. 3(a) and 3(b) are diagrams illustrating deployment behavior of an airbag cushion of the side airbag device of FIG. 1.
Figure 3B:
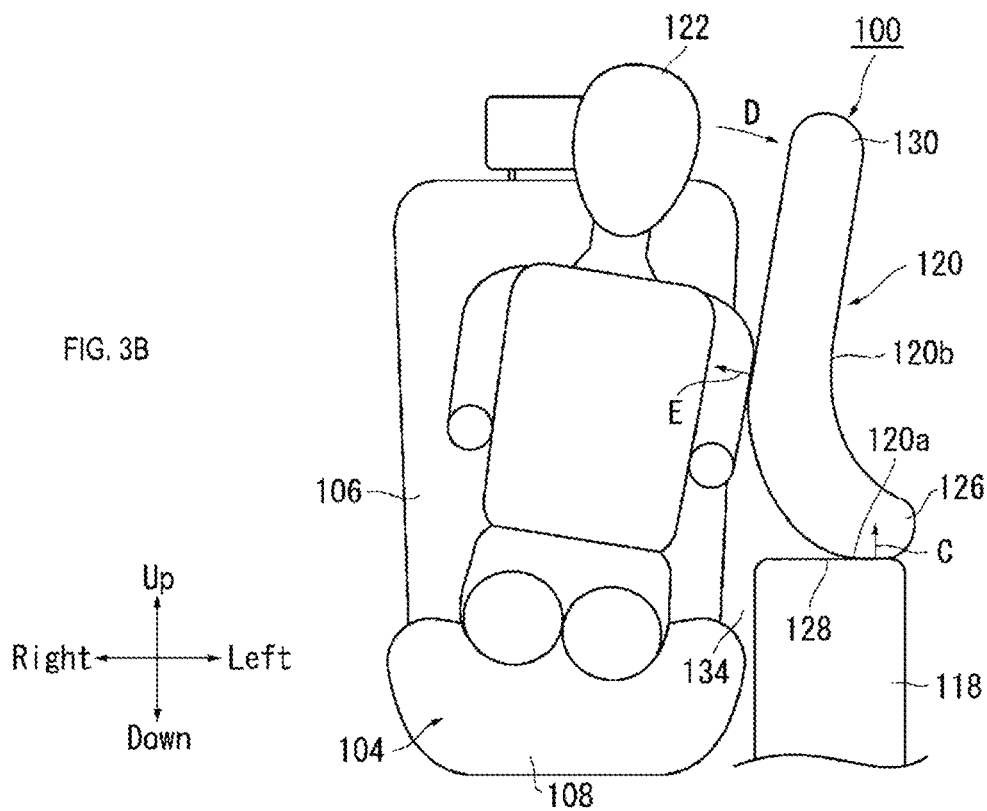

FIGS. 3(a) and 3(b) are diagrams illustrating deployment behavior of an airbag cushion 120 of the side airbag device 100 of FIG. 1. FIG. 3(a) illustrates initial deployment of the airbag cushion 120. FIG. 3(b) illustrates the airbag cushion 120 of FIG. 3(a) in an expanded and deployed state.

The lower end vicinity 126 of the airbag cushion 120 is folded back and upward on the opposite side (far side, left side of FIGS. 3(a) and 3(b)) of the occupant 122 at a folded back position 129, which is at a height position above the upper surface 128 of the console box when stowed in the vehicle seat 104, as depicted in FIG. 3(a). Therefore, the lower end vicinity 126 of the airbag cushion 120 is provided at a height position higher than the upper surface 128 of the console box 118 when stowed. In addition, as depicted in FIG. 3(a), the interior base material panel 120a of the airbag cushion 120 lower end vicinity 126 is positioned on the opposite side of the occupant 122.

Furthermore, as depicted in FIG. 2(a) and FIG. 2(b), in a state where the console box 118 is not present, the airbag cushion 120 is approximately straight up and down when expanded and deployed.

Therefore, the lower end vicinity 126 of the airbag cushion 120 deploys so as to move toward the upper surface 128 of the console box 118 as indicated by the arrow A in FIG. 3(a) when gas is supplied from the inflator 124. Furthermore, as depicted in FIG. 3(b), the expansion and deployment causes the interior base material panel 120a of the airbag cushion 120 lower end vicinity 126 to contact the upper surface 128 of the console box 118. Note that the upper end part 130 of the airbag cushion 120 is folded back to the opposite side (far side) of the occupant 122 of the vehicle seat 104, moves upward as indicated by the arrow B in FIG. 3(a), and further expands and deploys as indicated in FIG. 3(b).

Furthermore, the interior base material panel 120a of the airbag cushion 120 lower end vicinity 126 makes friction contact with the upper surface 128 of the console box 118 during expansion and deployment as indicated in FIG. 3(b). In this manner, the lower end vicinity 126 of the airbag cushion 120 is folded back to the opposite side (far side) of the occupant 122 of the vehicle seat 104 at a height position higher than the upper surface 128 of the console box 118 and is therefore positioned higher than the upper surface 128 of the console box 118 and is not able to enter into a gap 134 between the vehicle seat 104 and the console box 118.

Furthermore, a silicon coat, for example, is applied to the interior base material panel 120a part of the lower end vicinity 126 of the airbag cushion 120 that is a contact surface that makes friction contact with the upper surface 128 of the console box 118. In this manner, the interior base material panel 120a of the airbag cushion 120 lower end vicinity 126 includes a high friction surface with a friction coefficient larger than that of another surface of the airbag cushion 120. The coefficient of friction may be a static coefficient of friction or a dynamic coefficient of friction.

Therefore, for the airbag cushion 120, the interior base material panel 120a of the lower end vicinity 126 with a high friction coefficient makes friction contact with the upper surface 128 of the console box 118 so that when the airbag cushion 120 expands and deploys, movement on the upper surface 128 of the console box 118 in the vehicle width direction is suppressed and is difficult. Note that the interior base material panel 120a of the airbag cushion 120 lower end vicinity 126 is not limited to being silicon coated if the friction coefficient thereof can be set higher than that for other surfaces. As an example, an appropriate material with a higher friction coefficient than that of other surfaces can be attached by adhering or sewing to the interior base material panel 120a of the airbag cushion 120 lower end vicinity 126.

Furthermore, as indicated in FIG. 3(b), when the interior base material panel 120a of the airbag cushion 120 lower end vicinity 126 makes friction contact with the upper surface 128 of the console box 118, the lower end vicinity 126 receives a reaction force C from the upper surface 128 of the console box 118 causing the airbag cushion 120 to bend in a convex arch toward the vehicle seat 104. This causes a force on the airbag cushion 120 attempting to return to a natural shape (see FIGS. 2(a) and 2(b)) of approximately a straight line in the vertical direction of the vehicle during expansion and deployment.

Therefore, the lower end vicinity 126 of the airbag cushion 120 receives sufficient reaction force from the upper surface 128 of the console box 118 during expansion and deployment and so becomes a back shield for the airbag cushion 120 and can provide overall support to the airbag cushion 120 in restraining the occupant 122. As a result, even in the case, for example, the occupant 122 falls toward the center of the vehicle during a crash, as indicated by arrow D in FIG. 3(b), support of the airbag cushion 120 provided by the lower end vicinity 126 of the airbag cushion 120 enables reliable receiving and protecting of the occupant 122 by pushing on the occupant 122 with a force E during expansion and deployment.

Note that larger contact surface area of the lower end vicinity 126 of the airbag cushion 120 in friction contact with the upper surface 128 of the console box 118 increases the reaction force from the upper surface 128 of the console box 118. Therefore, the interior base material panel 120a of the lower end vicinity 126 of the airbag cushion 120 being folded into an L shape to cause friction contact with the upper surface 128 of the console box 118 enables a larger reaction force during expansion and deployment. However, if the airbag cushion 120 is bent into an L shape, a force causing returning to the original shape is difficult to generate. Therefore, the airbag cushion 120 being bent in a convex arch shape toward the vehicle seat 104 when the lower end vicinity 126 thereof is in friction contact with the upper surface 128 of the console box 118 enables reliable generation of the force E indicated in FIG. 3(*b*) and reliable receiving and protection of the occupant 122.

Furthermore, with the lower end vicinity 126 of the airbag cushion 120 folded back to the opposite side (far side) of the occupant 122 of the vehicle seat 104, friction contact on the upper surface 128 of the console box 118 is achieved during expansion and deployment making it difficult for the lower end vicinity 126 to enter into the gap 134 of the vehicle seat 104 and the console box 118; thereby simplifying controlling deployment behavior.

Preferred Embodiments of the present invention were described with reference to the appended drawings, but it goes without saying that the present invention is not limited to such examples. It is clear that a person of ordinary skill in the art could conceive various modifications or revisions within the scope set forth by the claims, and it would be understood that these modifications or revisions would belong to the technical scope of the present invention.

Moreover, the example in which the side airbag device according to the present invention is applied to an automobile has been described in the embodiments described above. However, in addition to automobiles, the present invention can be applied to aircrafts, ships, and the like, with the same operation and effects capable of being achieved.

INDUSTRIAL APPLICABILITY

The present invention can be applied to a side airbag device provided with a bag-shaped airbag cushion that expands and deploys to a side of the occupant in a vehicle seat in the event of a vehicle side impact or the like.

EXPLANATION OF REFERENCE SIGNS

100. Side airbag device, 102. Vehicle, 104, 110. Vehicle seat, 106, 112. Seatback, 108, 114. Seat cushion, 116. Side door, 118. Console box, 120. Airbag cushion, 120*a*. Interior base material panel, 120*b*. Exterior base material panel, 122. Occupant, 124. Inflator, 126. Lower end vicinity of airbag cushion, 128. Upper surface of console box, 129. Folded back position, 130. Upper end part of airbag cushion, 134. Gap.

The invention claimed is:

1. A side airbag device having a bag-shaped airbag cushion that utilizes gas supplied from an inflator to expand and deploy to a side of a vehicle seat, wherein:
   the airbag cushion includes an interior base material panel provided on an occupant side and an exterior base material panel provided on a side opposite the occupant,
   a surface of a lower end vicinity of the airbag cushion opposite the occupant is folded back in an upward direction and the interior base material panel of the lower end vicinity is stowed in the vehicle seat so as to be positionable on the side opposite the occupant, and
   the interior base material panel of the lower end vicinity makes friction contact with an upper surface of a console box for arrangement between the vehicle seat and an adjacent seat during expansion and deployment of the airbag cushion,
   wherein when the lower end vicinity of the airbag cushion is configured to make friction contact with the upper surface of the console box, the airbag cushion is configured to bend in a convex arch shape toward the vehicle seat.

2. The side airbag device according to claim 1, wherein when stowed in the vehicle seat, the lower end vicinity of the airbag cushion is positioned higher than the upper surface of the console box.

3. The side airbag device according to claim 1, wherein when the airbag cushion is stowed in the vehicle seat, the folded back position of the lower end vicinity of the airbag cushion is at a position higher than the upper surface of the console box.

4. The side airbag device according to claim 2, wherein when the airbag cushion is stowed in the vehicle seat, the folded back position of the lower end vicinity of the airbag cushion is at a position higher than the upper surface of the console box.

5. A side airbag device having a bag-shaped airbag cushion that is adapted to utilize gas supplied from an inflator to expand and deploy to a side of a vehicle seat, wherein:
   the airbag cushion includes an interior base material panel provided on an occupant side and an exterior base material panel provided on a side opposite the occupant,
   a surface of a lower end vicinity of the airbag cushion positionable opposite the occupant is folded back in an upward direction and the interior base material panel of the lower end vicinity is stowed in the vehicle seat so as to be positioned on the side opposite the occupant, and
   the interior base material panel of the lower end vicinity is adapted to make friction contact with an upper surface of a console box arranged between the vehicle seat and an adjacent seat during expansion and deployment of the airbag cushion,
   wherein a contact surface of the lower end vicinity of the airbag cushion interior base material panel that is adapted to make friction contact with the upper surface of the console box is provided with a high friction surface with a friction coefficient higher than an other surface of the airbag cushion.

6. The side airbag device according to claim 1, wherein a contact surface of the lower end vicinity of the airbag cushion interior base material panel that makes friction contact with the upper surface of the console box is provided with a high friction surface with a friction coefficient higher than another surface of the airbag cushion.

7. A side airbag device having a bag-shaped airbag cushion adapted to utilize gas supplied from an inflator to expand and deploy to a side of a vehicle seat, wherein:
   the airbag cushion includes an interior base material panel provided on an occupant side and an exterior base material panel provided on a side opposite the occupant,
   a surface of a lower end vicinity of the airbag cushion opposite the occupant is folded back in an upward direction and the interior base material panel of the lower end vicinity is stowed in the vehicle seat so as to be positioned on the side opposite the occupant, and
   the interior base material panel of the lower end vicinity is adapted to make friction contact with an upper surface of a console box arranged between the vehicle seat and an adjacent seat during expansion and deployment of the airbag cushion, and wherein when stowed in the vehicle seat, the lower end vicinity of the airbag cushion is positionable higher than the upper surface of the console box wherein a contact surface of the lower end vicinity of the airbag cushion interior base material panel that is adapted to make friction contact with the upper surface of the console box is provided with a high friction surface with a friction coefficient higher than another surface of the airbag cushion.

8. The side airbag device according to claim 1, wherein a contact surface of the lower end vicinity of the airbag cushion interior base material panel is adapted to make friction contact with the upper surface of the console box is provided with a high friction surface with a friction coefficient higher than another surface of the airbag cushion.

9. The side airbag device according to claim 3, wherein a contact surface of the lower end vicinity of the airbag cushion interior base material panel that is adapted to make friction contact with the upper surface of the console box is provided with a high friction surface with a friction coefficient higher than another surface of the airbag cushion.

\* \* \* \* \*